(12) United States Patent
Bellandi (10) Patent No.: US 12,122,041 B2
(45) Date of Patent: Oct. 22, 2024

(54) ELECTRIC TOOL CHANGER

(71) Applicant: GIMATIC S.R.L., Roncadelle (IT)

(72) Inventor: Giuseppe Bellandi, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 875 days.

(21) Appl. No.: 17/276,285

(22) PCT Filed: Aug. 5, 2019

(86) PCT No.: PCT/IB2019/056651
§ 371 (c)(1),
(2) Date: Mar. 15, 2021

(87) PCT Pub. No.: WO2020/058779
PCT Pub. Date: Mar. 26, 2020

(65) Prior Publication Data
US 2022/0024055 A1   Jan. 27, 2022

(30) Foreign Application Priority Data

Sep. 18, 2018   (IT) .................. 102018000008666

(51) Int. Cl.
*B25J 15/04*   (2006.01)
*B25J 19/00*   (2006.01)

(52) U.S. Cl.
CPC ....... *B25J 15/0416* (2013.01); *B25J 19/0033* (2013.01)

(58) Field of Classification Search
CPC .......................... B25J 19/0033; B25J 15/0416
See application file for complete search history.

(56) References Cited

U.S. PATENT DOCUMENTS

| 8,132,816 B2 | 3/2012 | Norton et al. |
| 8,209,840 B2 | 7/2012 | Norton |

(Continued)

FOREIGN PATENT DOCUMENTS

| DE | 10304507 B3 | 10/2004 | |
| DE | 202015101616 U1 * | 8/2016 | .......... B25J 15/0416 |

(Continued)

OTHER PUBLICATIONS

Schunk GmbH & Co KG "Electric Tool Changer EWS" http://www.schunk.com/schunk_files/attachments/OM_AU EWS_EN.pdf, Sep. 2016.

(Continued)

*Primary Examiner* — Eric A. Gates
*Assistant Examiner* — Reinaldo A Vargas Del Rio
(74) *Attorney, Agent, or Firm* — CANTOR COLBURN LLP (57) ABSTRACT

A tool changer is described, the tool changer includes a robot-side portion having a longitudinal axis and fixable to a manipulator, and a tool-side portion fixable to a tool and abuts against the robot- side portion along the longitudinal axis. The tool changer also includes a lock to lock the tool-side portion on the robot-side portion, and an actuator of the lock. The lock is selectively movable by the actuator between a locked position, where it engages the tool-side portion that abuts against the robot-side portion, thereby preventing the separation of the two portions of the tool changer, and an unlocked position, where it does not engage the tool-side portion, which can therefore be separated from the robot- side portion. The actuator of the lock is an electric motor whose drive shaft rotates on a rotation axis parallel to the longitudinal axis.

17 Claims, 7 Drawing Sheets

(56) References Cited

U.S. PATENT DOCUMENTS

| | | |
|---|---|---|
| 8,747,288 B2 | 6/2014 | Strotzer et al. |
| 10,047,908 B1 | 8/2018 | Bohle, II et al. |
| 2009/0322041 A1 | 12/2009 | Norton |
| 2012/0277080 A1 | 11/2012 | Strotzer |
| 2014/0045390 A1 | 2/2014 | Wittig et al. |
| 2017/0144230 A1 | 5/2017 | Rosso |
| 2018/0257221 A1 | 9/2018 | Toothaker et al. |

FOREIGN PATENT DOCUMENTS

| | | |
|---|---|---|
| DE | 102016222506 A1 | 5/2017 |
| JP | H01121139 A | 5/1989 |
| JP | H0241884 A | 2/1990 |
| JP | H0322889 U | 3/1991 |
| JP | H07223187 A | 8/1995 |
| WO | 2014045390 A1 | 3/2014 |

OTHER PUBLICATIONS

International Preliminary Report on Patentability for International Application No. PCT/IB2019/056651; International Filing Date Aug. 5, 2019; Report Mail Date Mar. 21, 2021 (7 Pages).
International Search Report and Written Opinion for International Application No. PCT/IB2019/056651; International Filing Date Aug. 5, 2019; Report Mail Date Nov. 20, 2019 (10 Pages).
Japanese Office Action for Japanese Application No. 2021-507848; Report Mail Date Aug. 1, 2023 with machine translation (15 Pages).

* cited by examiner

ELECTRIC TOOL CHANGER

FIELD OF THE INVENTION

This invention relates to an electric tool changer, in particular a tool changer for EOAT (end of arm tooling) applications that allows tools to be removably coupled to a robotic manipulator.

STATE OF THE ART

In the field of industrial automation, the use of tool changing devices, or more simply tool changers, is known, the tool changers allowing a robotic manipulator, for example an articulated arm, to pick up and move the tool each time required for a given machining operation.

The present invention refers in particular to tool changers comprising:
- a so-called tool-side portion, intended to be fixed to the tool to be picked up and moved, and
- a so-called robot-side portion, intended to be fixed to the manipulator to integrally move with it, and designed to receive and hold the tool-side portion for the required time.

Document DE 102016222506 in the name of the Applicant describes an example of tool changer of this type, electrically driven.

In this type of tool changer, the members intended to reversibly lock the tool-side portion are housed in the robot-side portion. Tool changers in which the locking members move at high speed to quickly engage and disengage, for example in less than 1 second, the tool-side portion are traditionally referred to as 'quick changer'.

For example, the German firm SCHUNK GmbH & Co KG sells under the name 'Electric Tool Changer EWS' an electrically driven tool changer described in detail in the specification sheet available at the following Internet address:http://www.schunk.com/schunk_files/attachments/OM_AU_EWS_EN. pdf.

Documents U.S. Pat. Nos. 8,132,816, 8,209,840, 8,747,288 and US 2012/0277080, in the name of ATI Industrial Automation, describe further examples of electrically driven tool changers. In particular, U.S. Pat. No. 8,132,816 describes a tool changer characterized in that the rotation axis of the shaft of the electric motor, which is the actuator, is orthogonal to the coupling direction of the tool-side portion with the robot-side portion, i.e. the direction in which one portion is inserted into the other.

In one of the most common configurations the members responsible for locking are metal balls housed in the robot-side portion and selectively movable between:
- a locked position, where the balls engage a corresponding seat or throat of the tool-side portion to prevent it from slipping off, and
- an idle position, where the balls do not engage the tool-side portion, which is therefore not held and can be separated from the robot-side portion.

In practice, the balls are housed in special seats in the robot-side portion and can be moved between a retracted position, i.e. the idle position, where they do not protrude or only partially protrude from the respective seats, and a protruding position, i.e. the locked position, where they protrude from the respective seats just enough to engage the tool-side portion and define a shape coupling, like an undercut, therewith.

The balls can be moved by using actuators, which in the present case are electric.

The Applicant found that solutions like the one described in U.S. Pat. No. 8,132,816, with orthogonal axes, are often affected by this drawback: the electric motor protrudes laterally from the tool changer and, in general, it is difficult to produce a tool changer with orthogonal axes that has minimum side dimensions, i.e. minimum side dimensions in the direction transverse to the coupling direction of the male portion with the female portion. This results in operational problems when the tool and the manipulator are operating in tight spaces, such as in a mold; in these cases it is desirable that the operation of the manipulator is not limited by the tool changer because of the dimensions thereof.

SUMMARY OF THE INVENTION

Object of the present invention is therefore to provide an electric tool changer that is particularly compact while having the same performance compared to traditional solutions.

Therefore, the present invention concerns an electric tool changer according to claim 1.

In particular, the present invention concerns a tool changer comprising:
- a first portion defined as robot-side portion, having a longitudinal axis and intended to be fixed to a manipulator;
- a second portion defined as tool-side portion, intended to be fixed to a tool and to abut against the robot-side portion along said longitudinal axis, which therefore is the axis along which the coupling of the two portions occurs;
- locking means to lock the tool-side portion on the robot-side portion, and an actuator of the locking means.

The locking means are selectively movable by the actuator between a locked position, where they engage the tool-side portion that abuts against the robot-side portion, thereby preventing the separation of the two portions of the tool changer, and an unlocked position, where they do not engage the tool-side portion, which can therefore be separated from the robot-side portion.

The actuator of the locking devices is an electric motor whose drive shaft rotates on a rotation axis parallel to the longitudinal axis and not orthogonal or skew with respect to the latter.

Even though this configuration results in reduced overall dimensions compared to solutions with orthogonal or skew axes, it provides the same performance: the electric motor can be positioned right abreast of the locking means and extends parallel to the longitudinal axis, while transversally it takes a little space, since length is the main dimension of motors.

Preferably the locking means comprise a plurality of balls housed in corresponding seats obtained in the robot-side portion. The balls act as retaining elements: in the locked position, the balls at least partially protrude from their respective seats and engage a throat or corresponding niches obtained in the tool-side portion, which is fitted on the robot-side portion, thus creating an undercut; in the unlocked position, on the other hand, the balls do not protrude from their respective seats and do not engage the throat or niches in the tool-side portion. In practice, the balls close against the tool-side portion, to lock the latter against the robot-side portion, and open to allow its release.

In the preferred embodiment, the balls can be radially moved with respect to the longitudinal axis in the respective seats. Preferably the balls are arranged around the longitudinal axis with a regular pitch, e.g. with center angles of 120°, or 90°, 45°, etc., depending on the number of balls.

Preferably the locking means comprise an annular control element arranged on the robot-side portion at a position radially more outward with respect to the balls and movable by the electric motor between a first position, where it forces the balls into the locked position, and a second position, where the balls are in the unlocked position. In practice, the movements of the annular control element are given by the electric motor and determine the position of the balls.

More preferably, the seats of the balls are radial through holes obtained in an element or wall of the robot-side portion and the annular control element comprises a circular portion that surrounds the seats and is provided with:

recesses in which the balls are received in the unlocked position, and ramps or inclined planes on which the balls abut in the locked position. In practice, the ramps or inclined planes are radially more inwards with respect to the recesses.

Two embodiments can be implemented. In a first embodiment, the ramps or inclined planes each extends on a plane that is not orthogonal to the radial direction. In this embodiment the ramps or inclined planes form an angle different from 90°. On the other hand, in a second embodiment, each of the ramps or inclined planes extends on a plane orthogonal to the radial direction.

Preferably the annular control element is mounted on the robot-side portion and can be rotated with respect to the latter on the longitudinal axis between:

a first angular position, corresponding to the locked position, in which the balls abut against the ramps or the inclined planes and the latter are in turn aligned with the seats of the balls, and at the same time the recesses are angularly misaligned with respect to the seats of the balls, and a second angular position, corresponding to the unlocked position, in which the balls are at least partly received in the recesses of the annular control element, the recesses being aligned with the seats of the balls, and at the same time the ramps or the inclined planes are angularly misaligned with respect to the seats of the balls.

In this configuration, the electric motor alternately rotates, by an angle α, the annular control element in either direction to lock/unlock the tool-side portion. This angle is equal to the center angle defined between the recesses and the ramps/inclined planes, where the center is on the longitudinal axis.

In the preferred embodiment, the robot-side portion comprises a cup-shaped element in which a male portion of the tool-side portion is inserted. The seats of the balls are holes obtained radially through the side wall of the cup-shaped element. The annular control element is slidingly fitted on the cup-shaped element and prevents the balls from coming out of their seats outwards. On the other hand, the balls are prevented from coming out inwards by making tapered seats, i.e. narrower in the part closest to the longitudinal axis, just enough to allow a part of the balls to protrude (in the locked position).

Preferably the annular control element comprises a lobed portion or lever coupled to the electric motor by means of an eccentric coupling.

Preferably, the tool changer comprises transmission means that rotate the annular control element on the longitudinal axis, in both directions, in response to the rotations imparted by the drive shaft of the electric motor, in both directions. Therefore, in this embodiment, the electric motor and the annular control element are not coupled directly but indeed through the transmission means.

The transmission means comprise a thrust element functionally interposed between the electric motor and the annular control element. The thrust element can be eccentrically rotated around the rotation axis of the drive shaft of the electric motor, i.e. it traces an arc of circle in response to the rotations imparted by the drive shaft itself, and applies a torque to the annular control element. This torque causes the annular control element to rotationally slides on the robot-side portion.

The eccentric coupling between the locking means and the electric motor ensures that the locked position is stable even when the electric motor is switched off, for example in case of electric blackout.

Preferably, the transmission means further comprise gears interposed between the thrust element and the drive shaft of the electric motor and defining the desired gear ratio between these components.

Preferably the annular control element is slightly elastic to compensate for clearances between the various components of the tool changer caused by manufacturing tolerances.

Preferably the tool changer comprises an electrical connection device for connecting electric power lines coming to the robot-side portion with corresponding electric power lines of the tool-side portion, intended to power precisely the tool. More preferably, the device comprises two connectors, one for each of the two portions of the tool changer, which are coaxially mounted along the longitudinal axis; this allows the cables to pass through the tool changer, substantially along the longitudinal axis thereof, and not outside where they may be a danger for the operators who are working near the robot in use. By coupling the tool-side portion to the robot-side portion, the two connectors are functionally coupled to make the electric power lines continuous and, vice versa, when the two portions of the tool changer are separated, the connectors are also separated.

BRIEF LIST OF THE FIGURES

Further characteristics and advantages of the invention will be more evident by the review of the following specification of a preferred, but not exclusive, embodiment, which is depicted for illustration purposes only and without limitation, with the aid of the attached drawings, in which.

DETAILED DESCRIPTION OF THE INVENTION

Referring to all the accompanying figures, the numeral 100 denotes a tool changer according to the present invention, comprising a robot-side portion 1 and a tool-side portion 2. The robot-side portion 1 is intended to be fixed to an industrial manipulator, e.g. a robotic arm, and the tool-side portion 2 is intended to be fixed to a tool which has to be interchangeably mounted on the manipulator, e.g. a gripper, a gripping element, tongs, a suction cup or, in general, any tool provided in the field of industrial automation EOAT.

Figure 1:
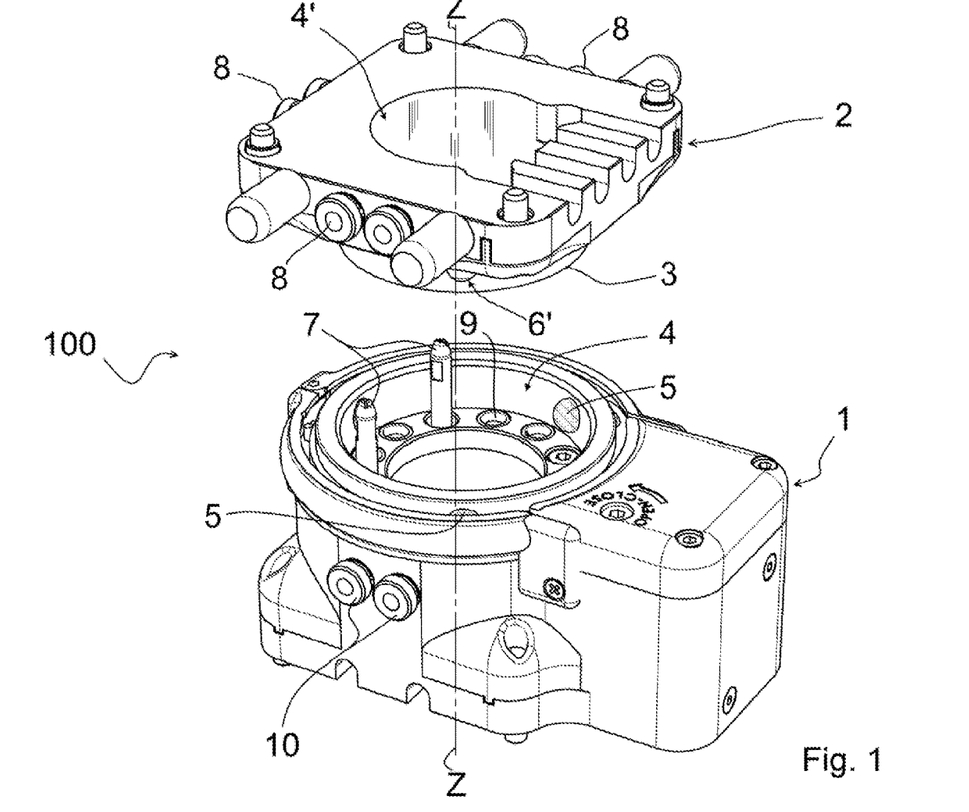
FIG. 1 is a perspective view of a tool changer according to the present invention, with the robot-side portion separated from the tool-side portion.
Figure 2:
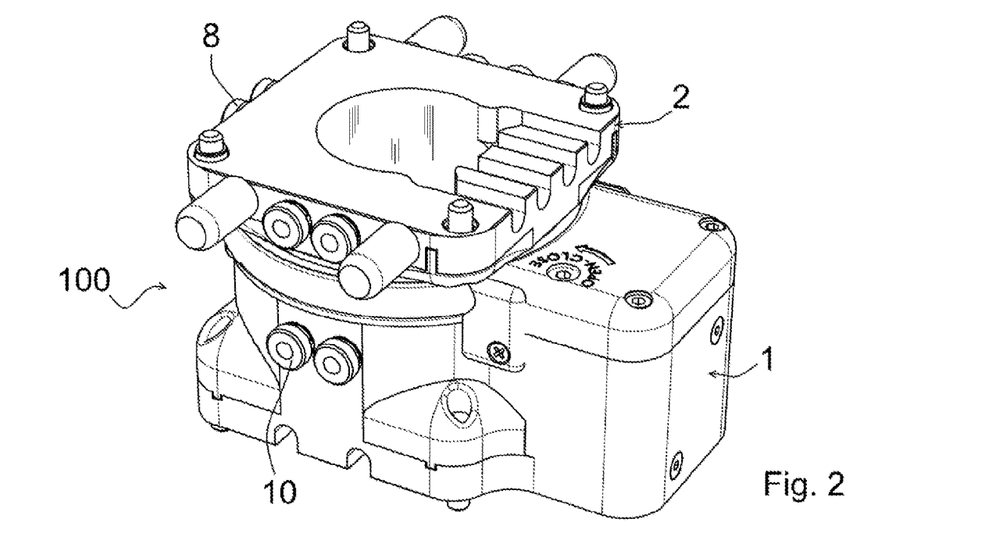
FIG. 2 is a perspective view of the tool changer shown in FIG. 1, with the robot-side portion coupled to the tool-side portion.

The reference Z-Z denotes a coupling axis of the portions 1 and 2, hereafter called longitudinal axis, i.e. the axis along which the tool-side portion 2 is at least partially inserted in the robot-side portion 1. In particular, FIG. 1 shows the two portions 1 and 2 separate from each other, e.g. moving close or away, while FIG. 2 shows the two portions 1 and 2 functionally coupled to each other, corresponding to a configuration in which the tool is mounted on the manipulator and is ready for use.

The tool-side portion 2 is provided with a male portion 3 that can be inserted in a corresponding first compartment 4 of the robot-side portion, preferably a through-compartment. Preferably the male portion 3 and the first compartment 4 have complementary shapes; in the example shown in the figures they are circular.

Preferably, as shown in the figures, the tool-side portion 2 extends around a second compartment 4', i.e. it is substantially toroidal.

The robot-side portion 1 is provided with a plurality of balls 5 housed in corresponding seats and movable between a retracted position, at which the balls 5 do not protrude from their own seat, and an extended position, at which the balls 5 at least partially protrude from their own seat. The tool-side portion 2 comprises a throat, holes or niches 6' obtained in the male portion 3 to receive the balls 5; when the balls 5 are in the extended position, a part of them is received in the niches 6' that are on the tool-side portion 2, thereby preventing the two portions 1 and 2 from separating but, instead, locking the tool-side portion 2 on the robot-side portion 1.

On the robot-side portion 1 there are aligning means whose function is to help the portions 1 and 2 to properly align as they move close to each other, and to ensure that the receiving niches 6' on the tool-side portion 2 are brought into alignment with the corresponding balls 5. In the example shown in the figures, the aligning means comprise two dowels 7 cantileverly protruding from the robot-side portion 1, in particular from the first compartment 4, and two corresponding holes or grooves being in the tool-side portion 2. The two dowels 7 identify an alignment direction both in radial direction, with respect to the Z-Z axis, and in angular direction between the balls 5 and the receiving niches 6'.

The embodiment shown in figures is equipped with pneumatic connections, although, in general, a tool changer according to the present invention can be manufactured regardless of this feature. The pneumatic connections are used to supply compressed air (or vacuum) to the tool combined with portion 2, by using ducts inside the tool changer 100 and not outer tubes.

In the example shown in the figures, the tool-side portion 2 is laterally provided with fittings 8 for the insertion of delivery lines for delivering compressed air to the tool. The fittings 8 are connected to nozzles (not visible) present in the male portion 3, by means of channels inside the tool-side portion 2. The nozzles of the tool-side portion 2 are received in corresponding nozzles 9 of the robot-side portion 1, which are present in the first compartment 4, the former making the tight fluid-connection with the latter. The nozzles 9 are in turn connected, through inner ducts, to fittings 10 which are on the side of the robot-side portion 1. Ultimately, therefore, when the two portions 1 and 2 are coupled to each other, the fittings 8 of the tool-side portion 2 are in fluid connection with the corresponding fittings 10 of the robot-side portion 1.

Figure 3:
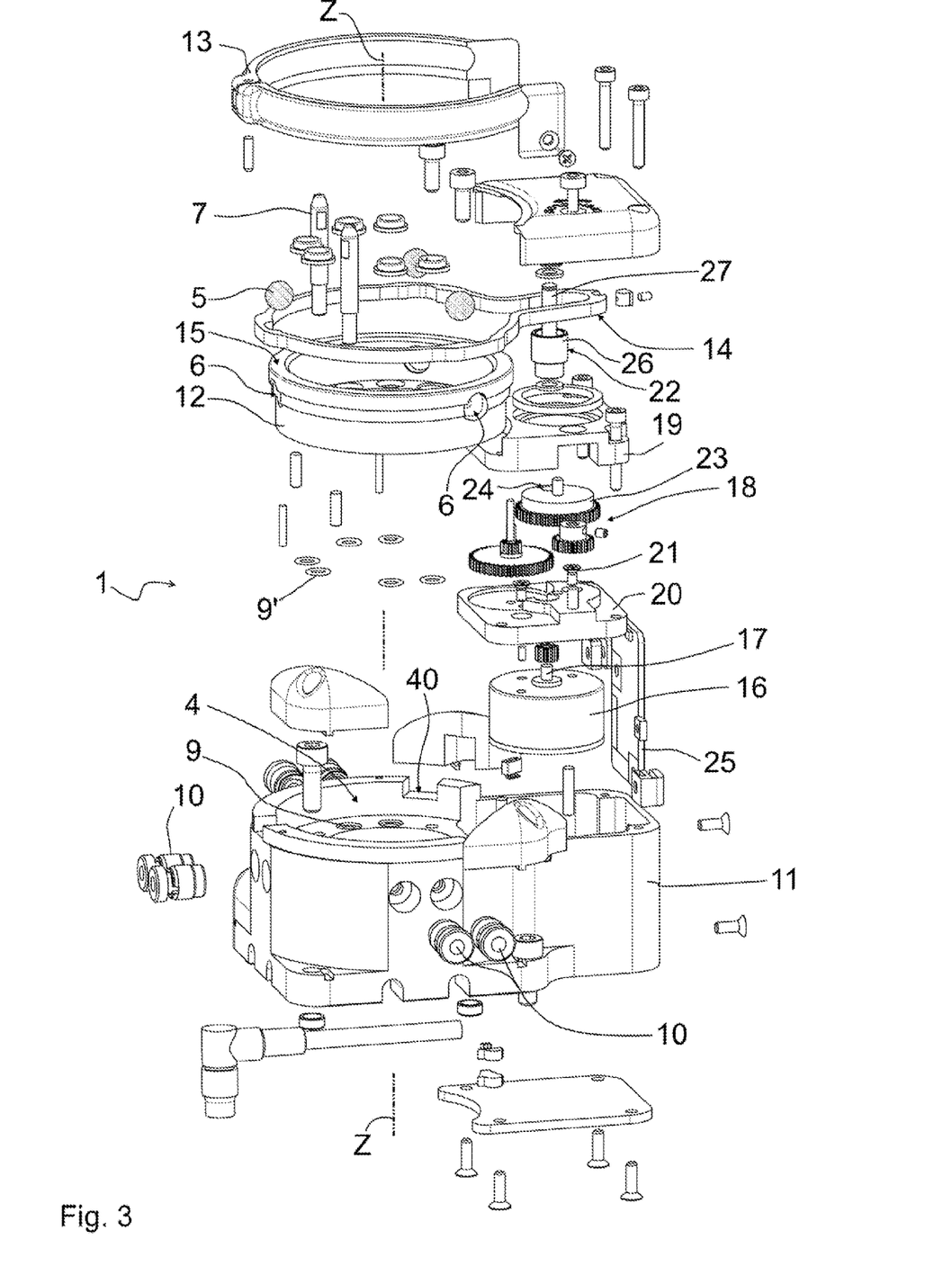
FIG. 3 is an exploded view of only the robot-side portion of the tool changer shown in FIG. 1.

Referring in particular to FIG. 3, the robot-side portion 1 comprises a body 11 in which the components are housed. A cup-shaped element 12 in which seats 6 of the balls 5 are obtained, is housed in the first compartment 4. The seats 6 are radial through-holes obtained through the side wall of the cup-shaped element 12, i.e. holes 6 facing the longitudinal axis Z-Z. A collar 13 with hull or cover function can be positioned on the cup-shaped element 12 to cover the edges. The reference numeral 9 denotes the 0-ring seals of the nozzles 9 circumferentially arranged in the cup-shaped element 12.

Clearly, when the tool-side portion 2 is properly inserted in the first compartment 4 of the robot-side portion 1, the seats 6 and the niches 6' face each other and are aligned in radial direction.

The reference numeral 14 denotes an annular control element whose function, as described below, is to push the balls 5 into the respective niches 6' to lock the tool-side portion 2 onto the robot-side portion 1. The annular control element 14 can be rotated in both directions on its lying plane orthogonal to the longitudinal axis Z-Z, in practice the upper surface of the cup-shaped element 12.

The annular control element 14 is driven by an electric motor 16 housed in the body 11 and arranged so that its drive shaft 17 is parallel to the longitudinal axis Z-Z. In other words, the rotation axis of the drive shaft 17 of the electric motor 16 is parallel to the longitudinal axis Z-Z along which the tool-side portion 2 is inserted into the robot-side portion 1. The reference numeral 18 denotes in general gears that are cascade-coupled to define the desired transmission ratio; the gears 18 are functionally coupled to the drive shaft 17 of the electric motor 16 and to a thrust element 22. The gears 18 are enclosed in a casing defined by two blocks 19 and 20 that are screwed to the body 11 and to which the electric motor 16 is fixed from below by the screws. The rotations imparted to the gears 18 by the electric motor 16 are imparted to the thrust element 22, which is eccentrically mounted on the gear 23, in particular in the hole 24.

In practice, therefore, the gears 18 define a transmission system, but what matters is that the rotations imparted by the electric motor 16 cause the thrust element 22 to rotate around an axis parallel to the longitudinal axis Z-Z, so that the thrust element follows a circular path.

Figure 4:
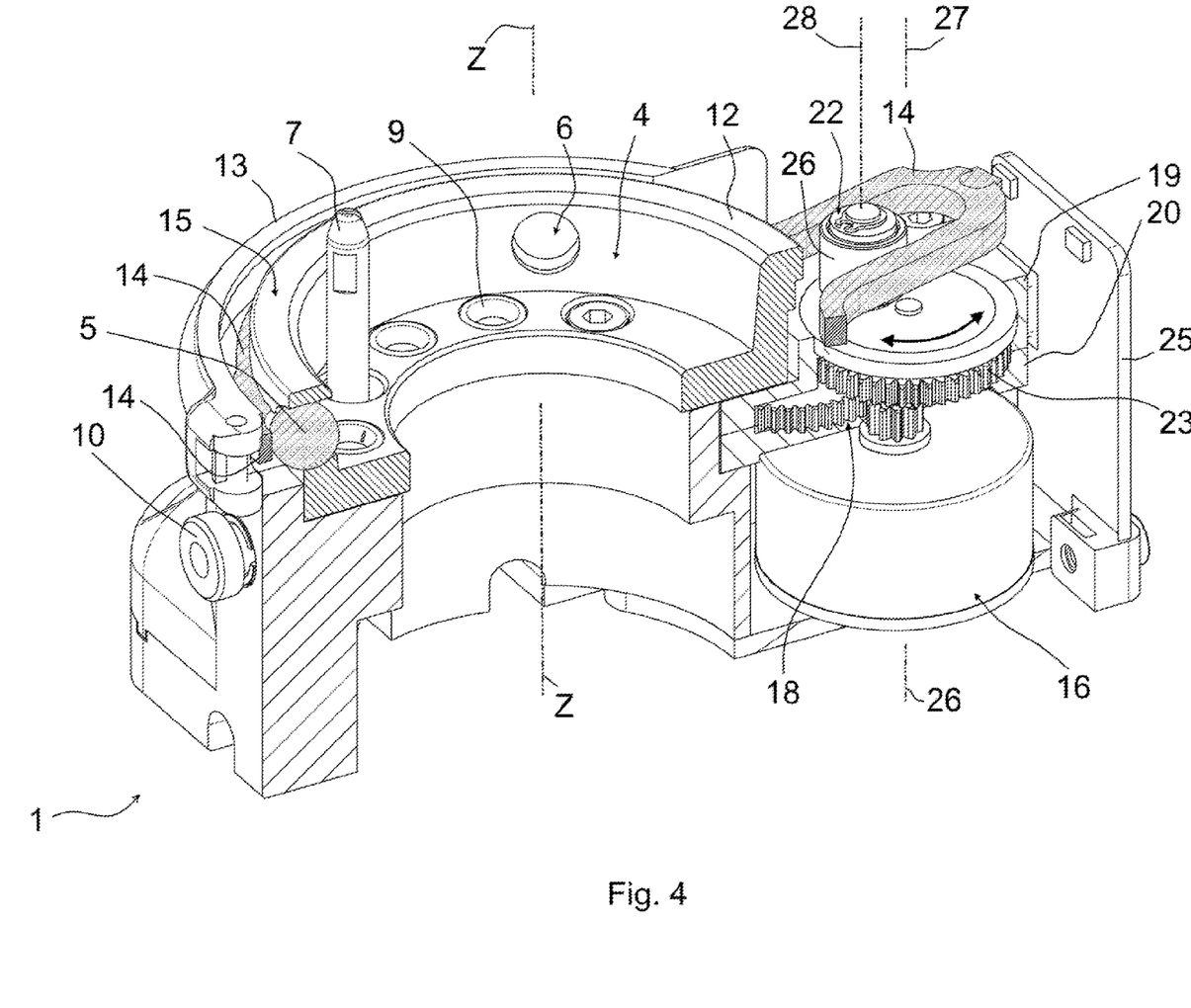
FIG. 4 is a longitudinal sectional view of the robot-side portion of the tool changer shown in FIG. 1.

This aspect can be easily understood by observing FIG. 4, which shows a longitudinal section of the robot-side portion 1 considered on a vertical plane containing the axis Z-Z: the rotation axis of the drive shaft 17 of the electric motor 16 is denoted by 26, the rotation axis of the gear 23 is denoted by 27, and the geometric axis of the thrust element 22 is denoted by 28. The geometric axis 28 rotates around the axis 27, i.e. the thrust element 22 remains parallel to the longitudinal axis Z-Z, but rotates around the center of rotation of the gear 23 on which it is mounted according to an eccentric coupling, as this coupling is defined in this patent application. Basically, between the geometric axis of the thrust element 22 and the rotation axis 26 of the electric motor 16 an arm is provided.

Thanks to the eccentric coupling just described, the tool changer 100 is irreversible, in the sense that even if the operation of the electric motor 16 was stopped due to malfunction or lack of power supply, the annular control element 14 would not be rotated by the balls 5, in the unlocked position. This ensures that the tool-side portion 2 cannot undesirably disengage from the robot-side portion 1, thereby improving safety.

The numeral 25 denotes the electronic control card of the electric motor 16. The motor can be operated in both directions of rotation, or else it can always rotate in the same direction: for example 200° rotation to lock and 160° rotation to unlock.

Preferably, as shown in the figures, the thrust element 22 is equipped with a pin on which an idle rotating roller 26 is mounted. Therefore the roller 26 can be rotated both on the geometric axis 28 of the thrust element and on the rotation axis 27 of the gear 23.

The annular control element 14 comprises a substantially circular portion 14' and a lobed portion 14" also definable as a lever and integral with the circular portion 14'.

The circular portion 14' in turn comprises:

recesses 29 in which the balls 5 are received when the tool-side portion 2 has to be inserted into or separated from the robot-side portion 1, i.e. when the robot-side portion 1 is in the unlocked configuration/position;

ramps 30, i.e. inclined and tapered surfaces, adjacent to the recesses 29, having the function of pushing the balls 5 at least partially out of their respective seats 6, so as to lead the robot-side portion into the locked configuration/position, at which the tool-side portion 2 cannot be separated. The ramps 30 radius the recesses 29 to the inner circumference of the annular control element 14. In the example shown in FIGS. 1-8, the ramps 30 each extends on an inclined plane not orthogonal to the radial direction.

The lobed portion 14" is hollow and fits on the thrust element 22, in the sense that the lobed portion 14" defines a guide 31 in which the thrust element 22 is inserted. In an alternative embodiment not shown in the figures, the lobed portion 14" is solid and the thrust element 22 is pivoted thereon.

Figure 5:
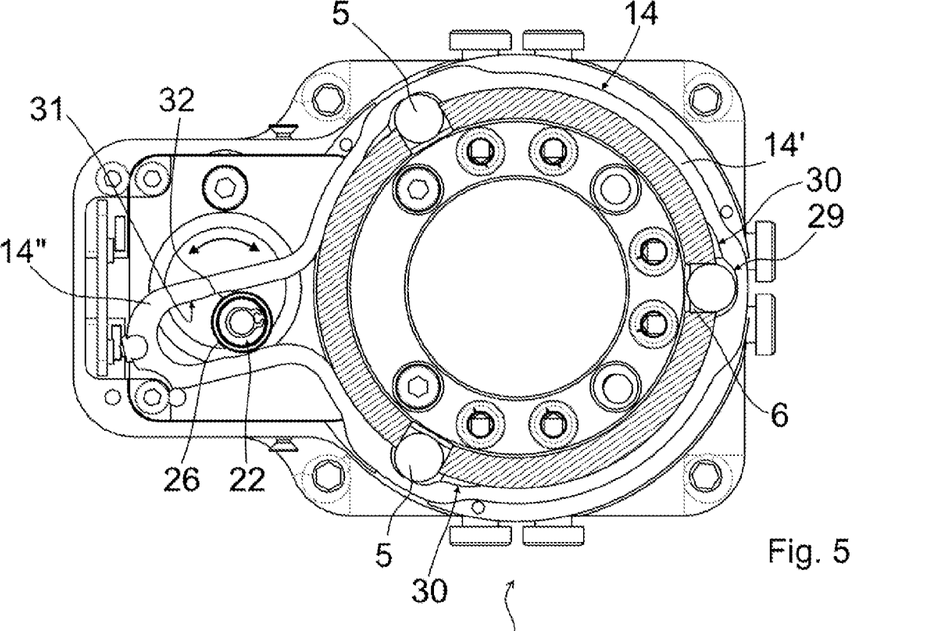
FIG. 5 is a cross-sectional view of the robot-side portion of the tool changer shown in FIG. 1, in a first configuration.

In FIG. 5 the robot-side portion 1 is shown in the unlocked configuration/position, with the balls 5 housed in the respective seats 6 of the cup-shaped element 12, and held therein by the annular control element 14. The balls 5 cannot fall from the cup-shaped element 12 because they are externally held by the annular control element 14.

Figure 6:
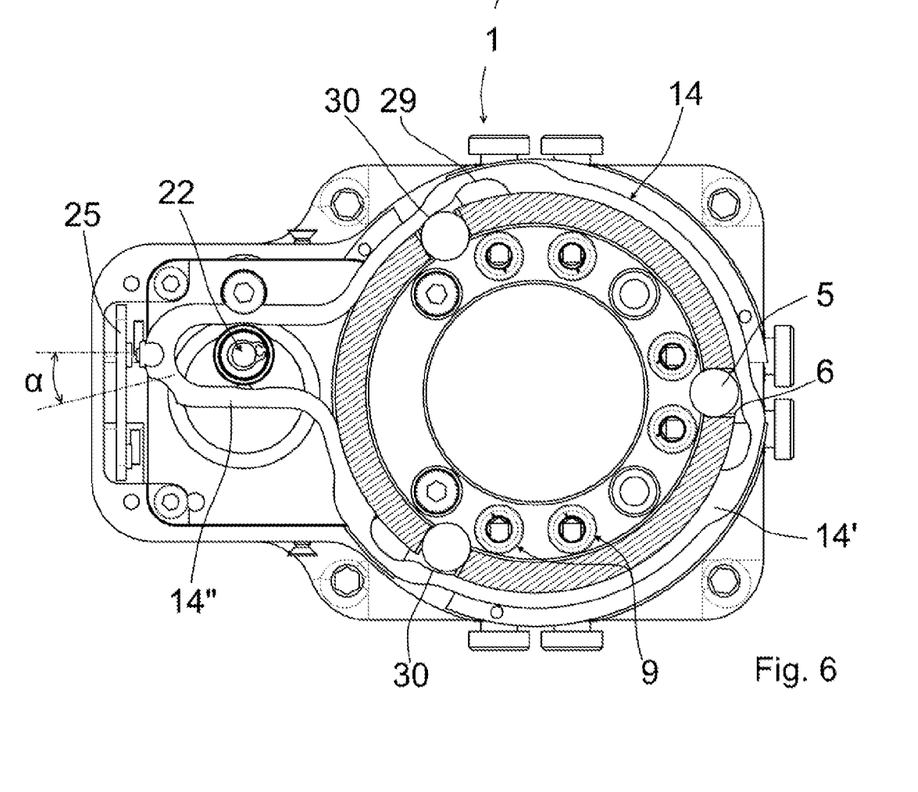
FIG. 6 is a cross-sectional view of the robot-side portion of the tool changer shown in FIG. 1, in a second configuration.

In FIG. 6 the robot-side portion 1 is shown in the locked configuration/position, with the balls 5 partially protruding inwards from the respective seats 6, i.e. towards the longitudinal axis Z-Z, due to the thrust exerted by the ramps 30 of the annular control element 14. The balls 5 cannot fall inside the cup-shaped element 12 because the seats 6 are slightly tapered, i.e. they become narrower in the direction of the axis Z-Z. Therefore, the balls 5 can at most protrude as shown in FIG. 6, but cannot extend further.

The balls 5, the corresponding niches 6' on the tool-side portion 2, the annular control element 14 and the thrust element 22 define all together the locking means to lock the tool-side portion 2 on the robot-side portion 1, the electric motor 16 being able to activate and deactivate them in order to lock the two portions 1 and 2 against each other, or to allow the latter to be separated.

The operation of the tool changer 100 can be understood by comparing FIGS. 5 and 6.

Starting from the unlocked position shown in FIG. 5, the electric motor 16 is activated, i.e. the respective drive shaft 17 rotates. The gear cascade 18 transmits the rotation to the gear 23 according to the transmission ratio defined by the ratio of the number of teeth of the gears. In turn, the gear 23 transmits the rotation to the thrust element 22 pivoted thereon. Since the thrust element 22 engages the guide 31 obtained in the lobed portion 14" of the annular control element 14, during the rotation the thrust element 22 in turn imparts thrust on the lobed portion 14", thereby causing the entire annular control element 14 to rotate on the longitudinal axis Z-Z.

In the example shown in FIGS. 5 and 6, the annular control element 14 has been rotated by an angle $\alpha$; in other words, the angle $\alpha$ corresponds to the rotation to be imparted to the annular control element 14 to lead the tool changer 100 from the locked to the unlocked positions, and vice versa, by imparting rotations in the opposite direction.

By observing FIG. 6 it can be noticed that the recesses 29 are no longer aligned with the balls 5, but are angularly staggered by an angle equal to the angle $\alpha$; the balls 5 are in abutment on the ramps 30, therefore the ramps 30 and the respective recesses 29 define a center angle equal to $\alpha$.

Preferably, depressions 32 that define stable positions for the thrust element 22 are obtained in the guide 31. The depressions contribute to prevent the robot-side portion 1 from accidentally switching to the unlocked configuration when the electric motor 16 is not powered, e.g. due to a blackout.

In the example shown in the figures, the interaction between the thrust element 22 and the guide 31 is facilitated by the rotation of the roller 26.

When the balls 5 partially protrude from their seats 6 towards the longitudinal axis Z-Z and the tool-side portion 2 is inserted in the first compartment 4, the protruding portion of the balls 5 is inserted in the niches 6' present in the male portion 3 of the tool-side portion 2.

Advantageously, as can be seen in the figures, by arranging the motor 16 with the respective rotation axis 26 parallel to the longitudinal axis Z-Z, the overall dimensions of the tool changer 100 can be minimized precisely in the longitudinal direction. As a result, the tool changer 100 is extremely compact, with the same performance with respect to a tool changer with orthogonal axes, i.e. with an electric motor arranged with rotation axis orthogonal to the longitudinal axis.

For example, the annular control element 14 can be obtained from a metal plate, by machining from solid or by laser cut.

Preferably the annular control element 14 is slightly elastic, a feature that allows an automatic recovery of any possible clearance between the parts, which are caused by manufacturing tolerances, and further allows a preload to be applied on the thrust element 22.

Figure 7:
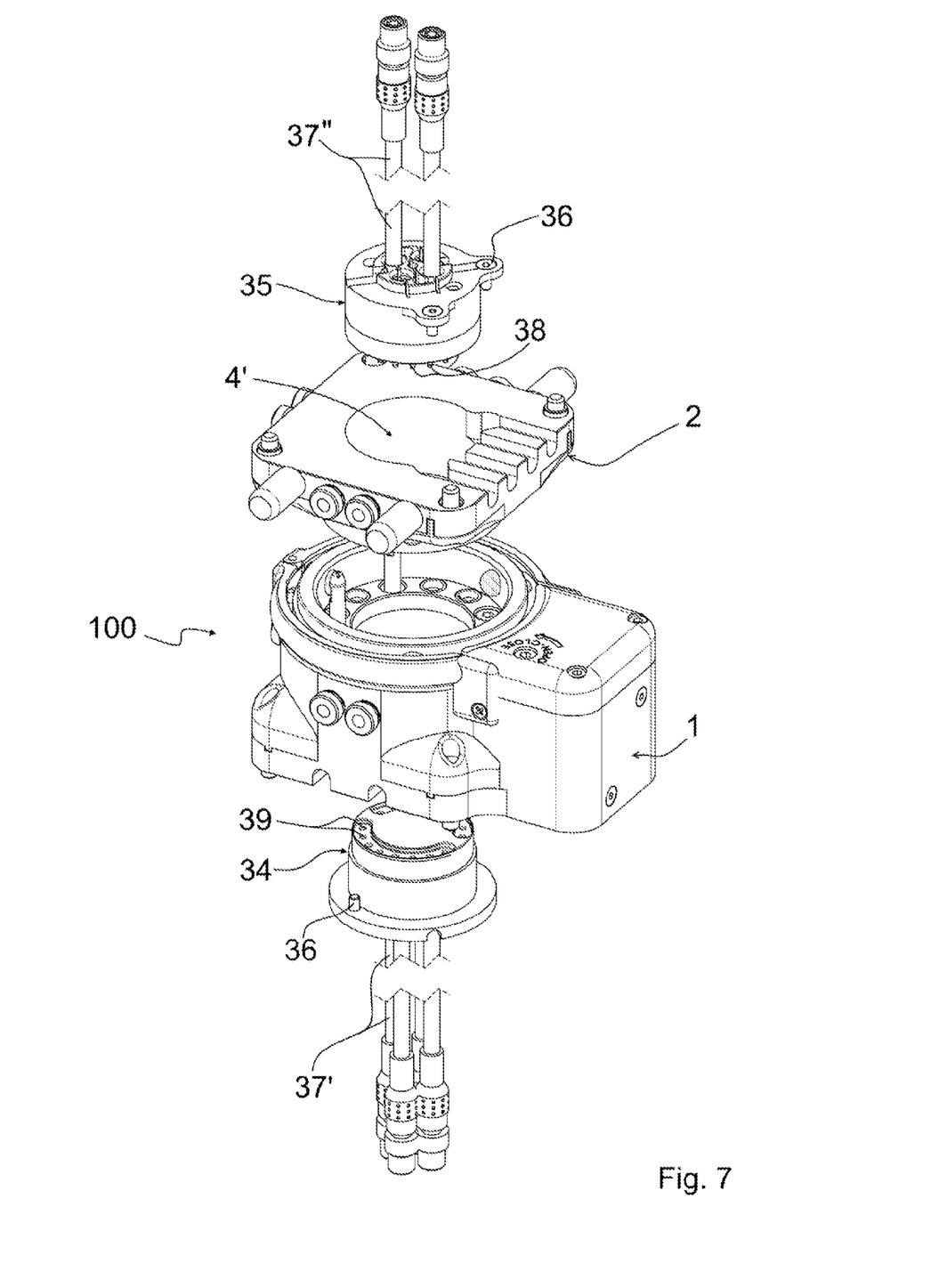
FIG. 7 is a perspective view of the tool changer shown in FIG. 1, with the robot-side portion separated from to the too-side portion, and accessory components.
Figure 8:
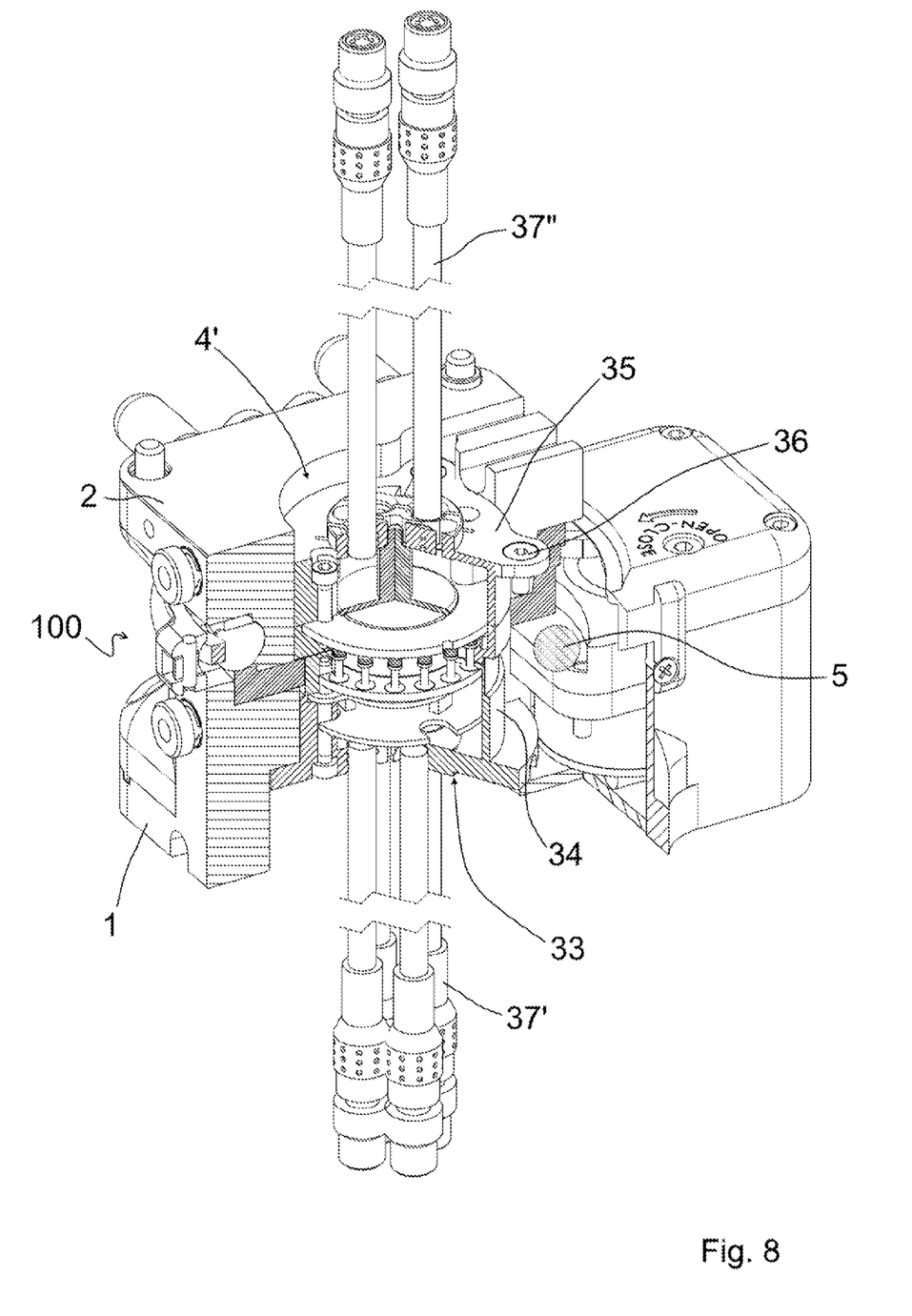
FIG. 8 is a perspective and partial longitudinal sectional view of the tool changer shown in FIG. 1, with the robot-side portion coupled to the tool-side portion, and with accessory components assembled.

FIGS. 7 and 8 show the tool changer 100 fitted with an electrical connection device 33, which comprises a first connector 34 that can be fixed to the robot-side portion 1 in the first compartment 4 and a second connector 35 that can be fixed to the tool-side portion 2, in the second compartment 4'. The connectors 34 and 35 can be fixed to the respective portions 1 and 2 of the tool changer 100 by means of screws 36.

Electric power lines 37' converge to the first connector 34, and electric power lines 37" converge to the second connector and have to be connected each to a corresponding electric power line 37'. For this reason, the second connector 35 is provided with connecting plugs 38, each connected to a line 37", and the first connector 34 is provided with corresponding connecting plugs 39.

Since the connectors 34 and 35 are coaxial, i.e. arranged along the longitudinal axis Z-Z, when the tool-side portion 2 is inserted into the compartment 4 of the robot-side portion 1, the two connectors 34 and 35 are functionally coupled, i.e. the plugs 38 and 39 are electrically connected so as to make the electric power lines 37' and 37" continuous. When the tool-side portion 2 is separated from the robot-side portion 1, also the connectors 34 and 35 are separated.

Advantageously, the device 33 allows the electric power lines 37' and 37" to be positioned through the compartment 4. This allows the use of the electric power lines 37', for the power supply of the tools, directly from the center of the robot wrist on which the tool changer 100 is mounted, thereby avoiding to move the electric power lines (power cables) around the robot during the rotations of the tool changer. In other words, thanks to this solution, cumbersome and dangerous power cables surrounding the tool can be avoided, thus improving the safety of people working near the tool itself.

As an alternative to the just described configuration, the device 33 also allows the electric power lines 37', 37" to be passed through the windows 40 that are radially opened in the compartment 4 (FIG. 3).

Preferably one or more electric power lines 37' and/or 37" comprise spring touch-probes.

Figure 9:
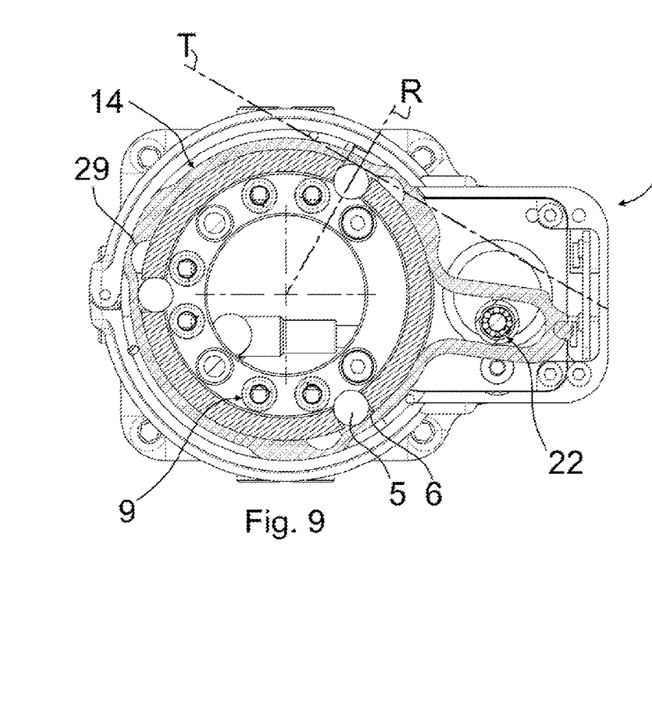
FIG. 9 is a cross-sectional view of the robot-side portion of a second embodiment of the tool changer according to the present invention, in a first configuration.
Figure 10:
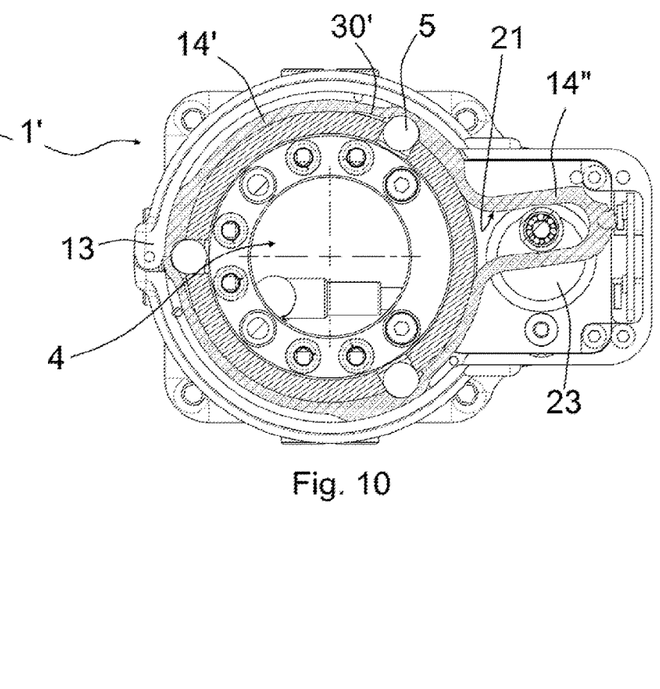
FIG. 10 is a cross-sectional view of the robot-side portion of the second embodiment of the tool changer according to the present invention, in a second configuration.
Figure 11:
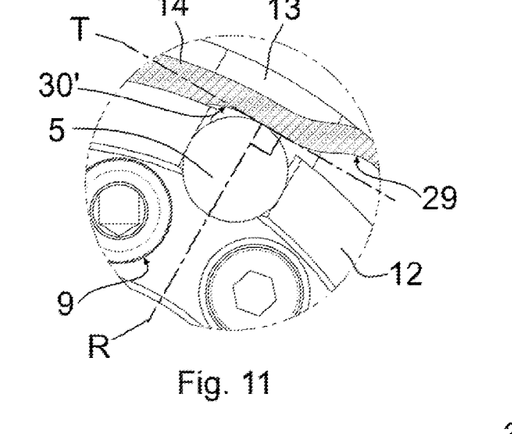
FIG. 11 is an enlargement of a portion of FIG. 9.

FIGS. 9-11 show a second embodiment 101 of the tool changer according to the present invention, which differs from the first embodiment 100 only in the shape of the annular control element 14, as will be explained below.

In particular, FIG. 9 is a plan view of the robot-side portion 1 in the locked configuration, i.e. with the balls 5 partially protruding from the respective seats 6 towards the longitudinal axis Z-Z (that passes through the center of the compartment 4), while FIG. 10 is a plan view of the robot-side portion 1 in the unlocked configuration, i.e. with the balls 5 completely received in the respective seats 6 obtained in the cup-shaped element 12.

FIG. 11 is an enlargement of a portion of FIG. 9, in which a ball 5 is shown.

Referring to FIGS. 9-11, in this embodiment the ramps 30' adjacent to the recesses 29 obtained on the annular control element 14 are tangent (plane T) to the radial direction (dashed line R), i.e. the ramps 30' each extends on a plane orthogonal to the diameter of the compartment 4 passing through the longitudinal axis Z-Z, as best shown in FIGS. 9 and 11. This configuration involves that there is not a position of the annular control element 14 in which a torque that can cause the rotation thereof is generated; the reason is simple: the balls 5 can transmit thrusts only in the radial direction, but since the ramps 30' are orthogonal to that direction, non-radial thrusts are not generated on the annular control element 14. As a result, the annular control element 14 cannot accidentally rotate and release the tool-side portion 2.

The invention claimed is:

1. A tool changer (100, 101) comprising:
    a robot-side portion (1), having a longitudinal axis (Z-Z), and configured to be fixed to a manipulator;
        a tool-side portion (2) configured to be fixed to a tool and to abut against the robot-side portion (1) along said longitudinal axis (Z-Z);
        a lock (5) to lock the tool-side portion (2) on the robot-side portion (1);
        an actuator of the lock (5);
        wherein the lock (5, 14) is selectively movable between a locked position, where the lock engages the tool-side portion (2) that abuts against the robot-side portion (1), thereby preventing separation from the robot-side portion (1), and an unlocked position, where the lock does not engage the tool-side portion (2), thereby allowing detachment of the tool-side portion (2) from the robot-side portion (1), wherein the actuator of the lock (5, 14) is an electric motor (16) having a drive shaft (17) rotating on a rotation axis (26) parallel to the longitudinal axis (Z-Z);
        wherein the lock (5, 14) comprises a plurality of balls (5) housed in corresponding seats (6) formed in the robot-side portion (1), and wherein in the locked position the balls (5) at least partially protrude from their respective seats (6) and engage a throat or corresponding niches (6') obtained in the tool-side portion (2), which is fitted on the robot-side portion (1), thus creating an undercut, and in the unlocked position the balls (5) do not protrude from their respective seats (6) and do not engage said throat or said niches (6') of the tool-side portion (2);
        wherein the lock (5, 14) comprises an annular control element (14) arranged on the robot-side portion (1) at a position radially more outward with respect to the balls (5) and movable by the electric motor (16) between a first position, where the annular control element (14) forces the balls (5) into the locked position, and a second position, where the balls (5) are in the unlocked position,
        wherein the annular control element (14) comprises a lobed portion or lever (14") coupled to the electric motor (16) by an eccentric coupling.

2. The tool changer (100, 101) according to claim 1, wherein the balls (5) are radially movable with respect to the longitudinal axis (Z-Z).

3. The tool changer (100, 101) according to claim 1, wherein the seats (6) of the balls (5) are radial through holes formed in an element (12) of the robot-side portion (1) and the annular control element (14) comprises a circular portion (14') that surrounds the seats (6) and is provided with:
    recesses (29) in which the balls (5) are received in the unlocked position, and
    ramps or inclined planes (30, 30') on which the balls (5) abut in the locked position.

4. The tool changer (100, 101) according to claim 3, wherein:
    each of the ramps or inclined planes (30) extends on a plane not orthogonal to the radial direction (R), or
    each of the ramps or inclined planes (30') extends on a plane (T) orthogonal to the radial direction (R).

5. The tool changer (100, 101) according to claim 3, wherein the annular control element (14) is mounted on the robot-side portion (1) and rotates with respect to the robot-side portion (1) on the longitudinal axis (Z-Z) between:
- a first angular position, corresponding to the locked position, in which the balls (5) abut against said ramps or said inclined planes (30, 30') and the ramps or said inclined planes (30, 30') are in turn aligned with the seats (6) of the balls (5), and the recesses (29) are angularly misaligned with respect to the seats (6) of the balls (5), and
- a second angular position, corresponding to the unlocked position, in which the balls (5) are at least partly received in the recesses (29) of the annular control element (14) the recesses being aligned with the seats (6) of the balls (5), and said ramps or said inclined planes (30, 30') being angularly misaligned with respect to the seats (6) of the balls (5).

6. The tool changer (100, 101) according to claim 5, wherein the electric motor (16) rotates the annular control element (14) alternately in either directions to lock/unlock the tool-side portion (2), by an angle (a) equal to a center angle (on the longitudinal axis Z-Z) defined by the recesses (29) and by said ramps or said inclined planes (30, 30').

7. The tool changer (100, 101) according to claim 1, wherein the robot-side portion (1) comprises a cup-shaped element (12) in which a male portion (3) of the tool-side portion (2) is inserted, and in which the seats (6) of the balls (5) are holes radially formed through a side wall of the cup element (12), and the annular control element (14) is slidingly fitted on the cup-shaped element (12) and prevents the balls (5) from outwardly coming out of their respective seats (6).

8. The tool changer (100, 101) according to claim 1, further comprising a transmission (18, 22) to rotate the annular control element (14) on the longitudinal axis (Z-Z), in both directions, in response to rotations imparted by the drive shaft (17) of the electric motor (16), in both directions.

9. The tool changer (100, 101) according to claim 8, wherein said transmission comprises a thrust element (22) functionally interposed between the electric motor (16) and the annular control element (14), wherein the thrust element (22) eccentrically rotates around the rotation axis (26) of the drive shaft (17) of the electric motor (16), in response to the rotations imparted by the drive shaft (17) itself, and applies a torque to the annular control element (14).

10. The tool changer (100, 101) according to claim 9, wherein the transmission further comprises gears (18) interposed between the thrust element (22) and the drive shaft (17) of the electric motor (16) to define a gear ratio there between.

11. The tool changer (100, 101) according to claim 1, wherein the annular control element (14) has elasticity to compensate for clearances between components of the tool changer due to manufacturing tolerances.

12. The tool changer (100, 101) according to claim 1, wherein the locked position of the locking devices (5, 14) is stable even when the electric motor (16) is switched off.

13. The tool changer (100, 101) according to claim 1, further comprising an electrical connection device (33) provided with a first connector (34) mountable on the robot-side portion (1) and a second connector (35) mountable on the tool-side portion (2),
- wherein each of the first connector (34) and the second connector (35) supports at least one electric power line (37', 37") functionally couplable in order to electrically connect corresponding electric power lines (37', 37") to each other, and are separable to disconnect the electric power lines (37', 37"),
- wherein the first connector (34) and the second connector (35) are mounted at the longitudinal axis (Z-Z).

14. The tool changer (100, 101) according to claim 13, wherein the electric power lines (37, 37") connected by the electrical connection device (33) pass through two portions (1, 2) of the tool changer substantially along the longitudinal axis (Z-Z).

15. The tool changer (100, 101) according to claim 1, further comprising an electrical connection device (33) provided with a first connector (34) mountable on the robot-side portion (1) and a second connector (35) mountable on the tool-side portion (2),
- wherein the connectors (34, 25) support corresponding electric power lines (37', 37") and are connectable or dis-connectable together with the robot-side portion (1) and tool-side portion (2), and
- wherein the robot-side portion (1) extends around a first compartment (4) coaxial to the longitudinal axis (Z-Z) and the first connector (34) is installable in said first compartment (4) and/or
- wherein the tool-side portion (2) extends around a second compartment (4') coaxial to the longitudinal axis (Z-Z) and the second connector (35) is installable in said second compartment (4').

16. A tool changer (100, 101) comprising:
- a robot-side portion (1), having a longitudinal axis (Z-Z), and configured to be fixed to a manipulator;
- a tool-side portion (2) configured to be fixed to a tool and to abut against the robot-side portion (1) along said longitudinal axis (Z-Z);
- a lock (5) to lock the tool-side portion (2) on the robot-side portion (1);
- an actuator of the lock (5); and
- wherein the lock (5, 14) is selectively movable between a locked position, where the lock engages the tool-side portion (2) that abuts against the robot-side portion (1), thereby preventing separation from the robot-side portion (1), and an unlocked position, where the lock does not engage the tool-side portion (2), thereby allowing detachment of the tool-side portion (2) from the robot-side portion (1), wherein the actuator of the lock (5, 14) is an electric motor (16) having a drive shaft (17) rotating on a rotation axis (26) parallel to the longitudinal axis (Z-Z);
- wherein the lock (5, 14) includes a plurality of balls (5) housed in corresponding seats (6) formed in the robot-side portion (1), and wherein in the locked position the balls (5) at least partially protrude from their respective seats (6) and engage a throat or corresponding niches (6') obtained in the tool-side portion (2), which is fitted on the robot-side portion (1), thus creating an undercut, and in the unlocked position the balls (5) do not protrude from their respective seats (6) and do not engage said throat or said niches (6') of the tool-side portion (2);
- wherein the lock (5, 14) includes an annular control element (14) arranged on the robot-side portion (1) at a position radially more outward with respect to the balls (5) and movable by the electric motor (16) between a first position, where the annular control element (14) forces the balls (5) into the locked position, and a second position, where the balls (5) are in the unlocked position,
- wherein the seats (6) of the balls (5) are radial through holes formed in an element (12) of the robot-side portion (1) and the annular control element (14) includes a circular portion (14') that surrounds the seats (6) and is provided with recesses (29) in which the balls (5) are received in the unlocked position and ramps or inclined planes (30, 30') on which the balls (5) abut in the locked position,
- wherein the annular control element (14) is mounted on the robot-side portion (1) and rotates with respect to the robot-side portion (1) on the longitudinal axis (Z-Z) between a first angular position, corresponding to the locked position, in which the balls (5) abut against said ramps or said inclined planes (30, 30') and the ramps or said inclined planes (30, 30') are in turn aligned with the seats (6) of the balls (5), and the recesses (29) are angularly misaligned with respect to the seats (6) of the balls (5) and a second angular position, corresponding to the unlocked position, in which the balls (5) are at least partly received in the recesses (29) of the annular control element (14) the recesses being aligned with the seats (6) of the balls (5), and said ramps or said inclined planes (30, 30') being angularly misaligned with respect to the seats (6) of the balls (5); and
- wherein the electric motor (16) rotates the annular control element (14) alternately in either directions to lock/unlock the tool-side portion (2), by an angle (a) equal to a center angle (on the longitudinal axis Z-Z) defined by the recesses (29) and by said ramps or said inclined planes (30, 30').

17. A tool changer (100, 101) comprising:
a robot-side portion (1), having a longitudinal axis (Z-Z), and configured to be fixed to a manipulator;
a tool-side portion (2) configured to be fixed to a tool and to abut against the robot-side portion (1) along said longitudinal axis (Z-Z); and
a lock (5) to lock the tool-side portion (2) on the robot-side portion (1);
an actuator of the lock (5);
wherein the lock (5, 14) is selectively movable between a locked position, where the lock engages the tool-side portion (2) that abuts against the robot-side portion (1), thereby preventing separation from the robot-side portion (1), and an unlocked position, where the lock does not engage the tool-side portion (2), thereby allowing detachment of the tool-side portion (2) from the robot-side portion (1), wherein the actuator of the lock (5, 14) is an electric motor (16) having a drive shaft (17) rotating on a rotation axis (26) parallel to the longitudinal axis (Z-Z);
wherein the lock (5, 14) comprises a plurality of balls (5) housed in corresponding seats (6) formed in the robot-side portion (1), and wherein in the locked position the balls (5) at least partially protrude from their respective seats (6) and engage a throat or corresponding niches (6') obtained in the tool-side portion (2), which is fitted on the robot-side portion (1), thus creating an undercut, and in the unlocked position the balls (5) do not protrude from their respective seats (6) and do not engage said throat or said niches (6') of the tool-side portion (2);
wherein the lock (5, 14) comprises an annular control element (14) arranged on the robot-side portion (1) at a position radially more outward with respect to the balls (5) and movable by the electric motor (16) between a first position, where the annular control element (14) forces the balls (5) into the locked position, and a second position, where the balls (5) are in the unlocked position; and
a transmission (18, 22) to rotate the annular control element (14) on the longitudinal axis (Z-Z), in both directions, in response to rotations imparted by the drive shaft (17) of the electric motor (16), in both directions, the transmission including a thrust element (22) functionally interposed between the electric motor (16) and the annular control element (14), wherein the thrust element (22) eccentrically rotates around the rotation axis (26) of the drive shaft (17) of the electric motor (16), in response to the rotations imparted by the drive shaft (17) itself, and applies a torque to the annular control element (14).

* * * * *